United States Patent [19]

Williams et al.

[11] 3,993,174

[45] Nov. 23, 1976

[54] HYDRAULIC BICYCLE BRAKE SYSTEM

[75] Inventors: Lynn A. Williams, Winnetka;
George P. Costello, Evergreen Park;
Leonard R. Malkowski, LaGrange,
all of Ill.

[73] Assignee: Lynn A. Williams Engineering Company, Elk Grove Village, Ill.

[22] Filed: Apr. 11, 1974

[21] Appl. No.: 459,877

Related U.S. Application Data

[63] Continuation-in-part of Ser. No. 419,498, Dec. 6, 1973, abandoned.

[52] U.S. Cl. .................................. 188/344; 60/562;
60/581; 92/92; 188/72.6; 188/345; 188/349
[51] Int. Cl.² ...................... B60T 11/24; B62L 3/02
[58] Field of Search ................... 188/59, 72.6, 72.9,
188/344, 349, 106 P, 345; 92/92; 60/562, 581

[56] References Cited
UNITED STATES PATENTS

| 869,948 | 11/1907 | Turner | 188/344 |
|---|---|---|---|
| 2,456,869 | 12/1948 | Fowler | 60/581 |
| 2,830,679 | 4/1958 | Butler | 188/72.9 X |
| 2,885,034 | 5/1959 | Holin | 188/59 X |
| 3,554,334 | 1/1971 | Shimano et al. | 188/344 |
| 3,776,333 | 12/1973 | Mathauser | 188/344 |

FOREIGN PATENTS OR APPLICATIONS

| 476,874 | 12/1952 | Italy | 60/562 |

*Primary Examiner*—George E. A. Halvosa
*Attorney, Agent, or Firm*—Dressler, Goldsmith, Clement, Gordon & Shore, Ltd.

[57] ABSTRACT

Caliper type bicycle brakes for the front and rear wheel are actuated simultaneously by a single actuator assembly mounted adjacent the handlebar. Hydraulic fluid under pressure is delivered to the brakes through two self-contained hydraulic circuits, one for the front brake and one for the rear brake. The brake system includes a device for applying a greater braking force at the front wheel than at the rear wheel. In an alternate embodiment the brake system is actuated by the chain drive system of the bicycle. Improved brake shoe elements and a device for wiping water from the wheel rim for enhanced wet weather braking are also disclosed.

16 Claims, 20 Drawing Figures

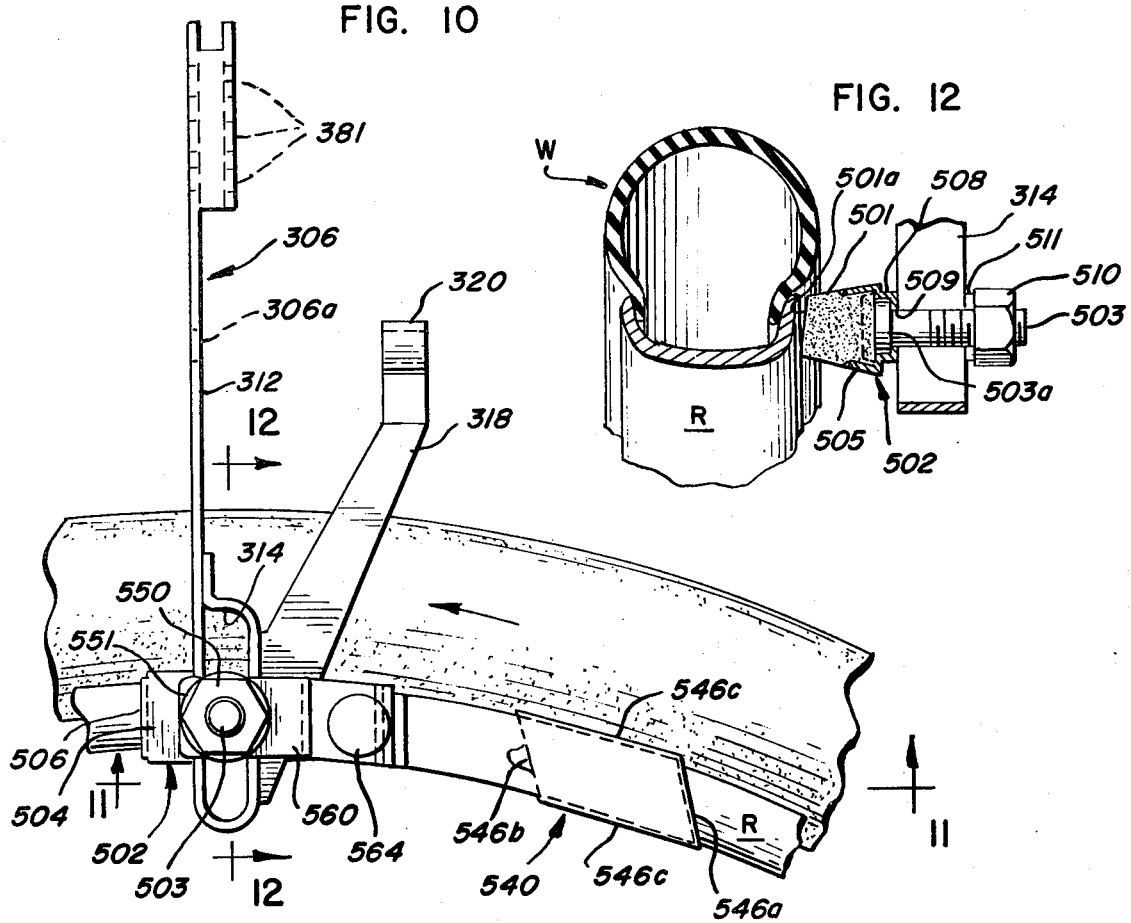
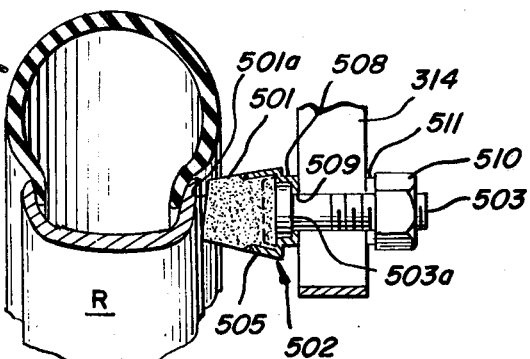
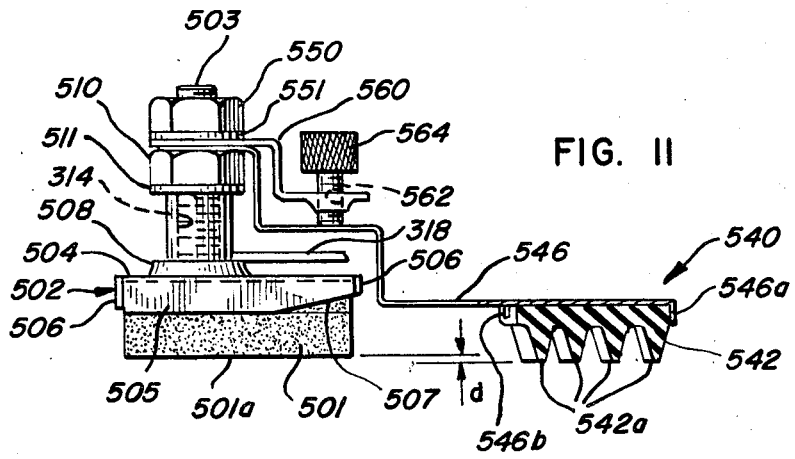

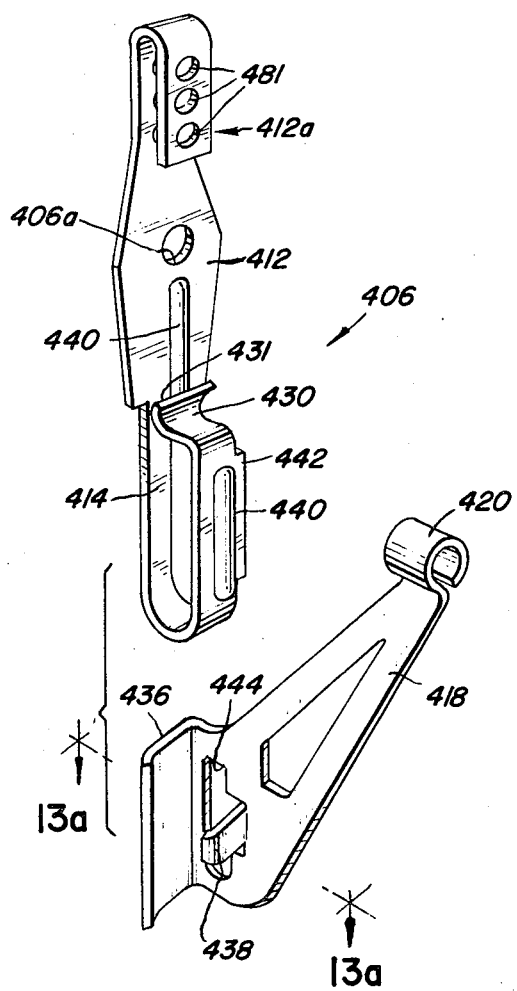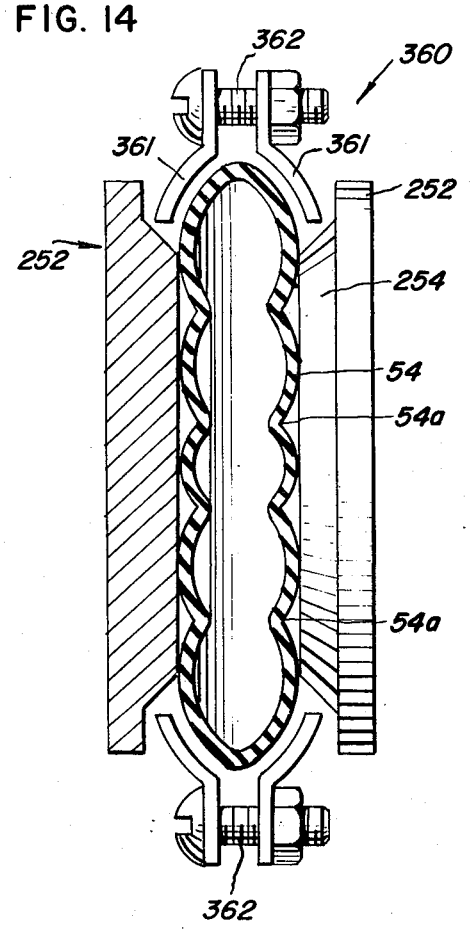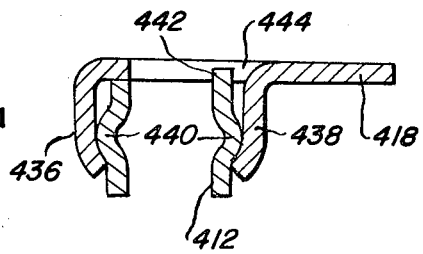

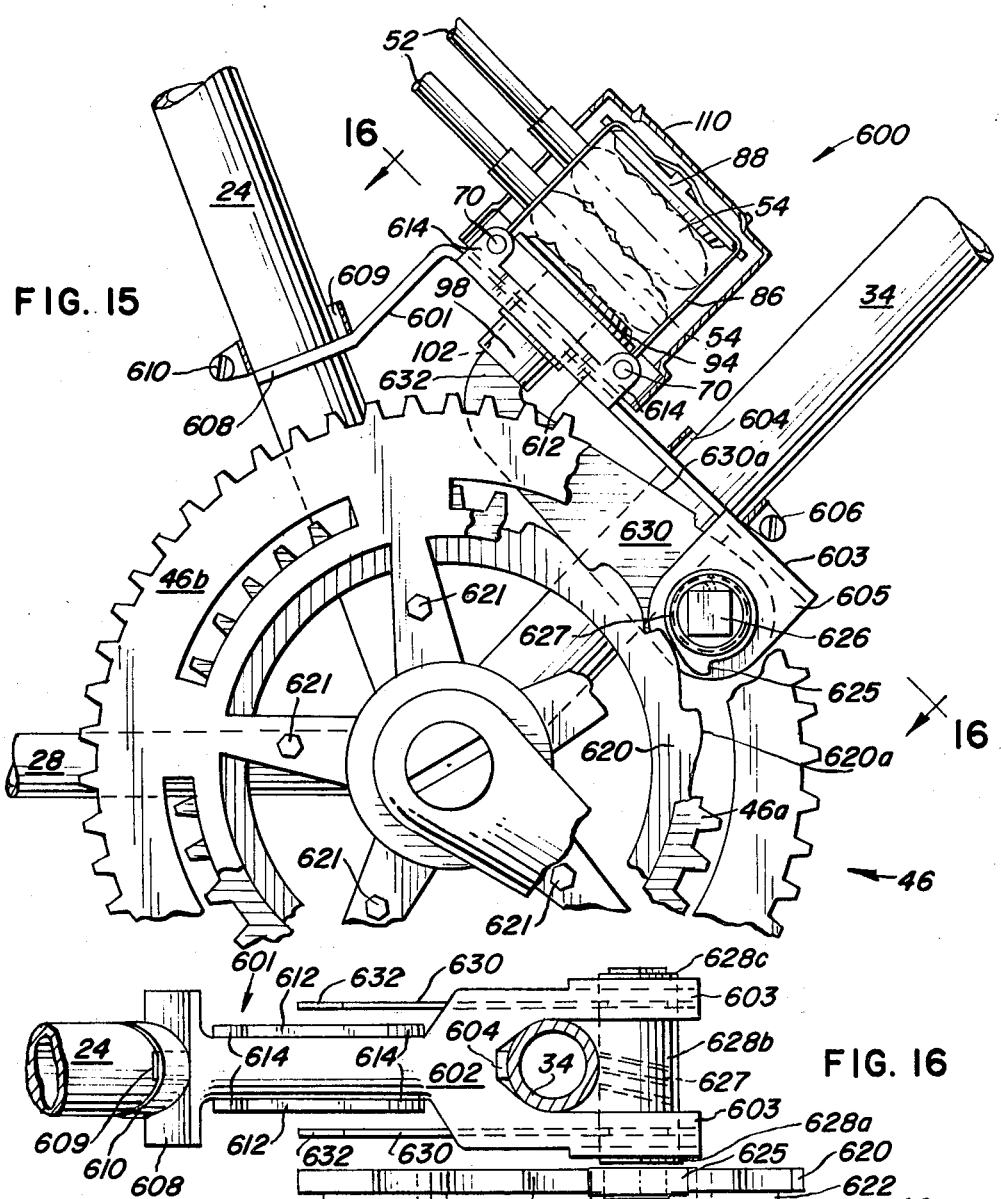
FIG. 15
FIG. 16
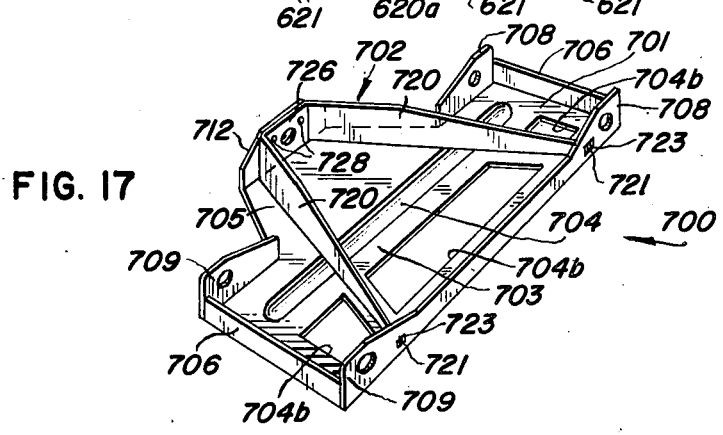
FIG. 17

HYDRAULIC BICYCLE BRAKE SYSTEM

CROSS-REFERENCE TO RELATED APPLICATION

This application is a continuation-in-part application of our application Ser. No. 419,498, filed Dec. 6, 1973, now abandoned.

The present invention relates to the field of brakes, and more particularly to the field of hydraulic bicycle brakes.

BACKGROUND OF THE INVENTION

With the ever growing popularity of bicycling throughout the world, increased consideration has been given to the desirability of safety standards regarding the ability of bicycle brakes to stop a bicycle within a certain distance, as well as the durability of the various elements of bicycle brakes. Such increased discussion of safety standards has been prompted, among other things, by studies such as that carried out in the United States by the National Electronic Injury Surveillance System (N.E.I.S.S.). As reported in the United States Department of Health, Education and Welfare (H.E.W.) proposed regulations under Title 21 of the Code of Federal Regulations, Parts 191 and 191c,38 Federal Register 12300 (May 10, 1973), the N.E.I.S.S. study estimates that there are more than 1,000,000 accidents annually related to bicycles. The commentary to the proposed H.E.W. regulations also points out that, according to the United States National Safety Council, 38,000 bicycle accidents each year involve motor vehicles, and that over 800 of these accidents result in the death of the bicyclist. Important causes for these accidents are said to be:d (1) slippage of the rider's foot off the pedal, (2) brake failure, (3) a component failure, and (4) poor night visibility.

While bicycle riding is enjoyed by people of all ages, the young — i.e., a child under 16 years of age — may be especially inexperienced at handling his bicycle in emergencies. Thus, in panic stop situations, if his bicycle is equipped with hand-operated, caliper type brakes, the child may be unable to brake the bicycle properly. Improper braking will result in a longer braking distance, and uncoordinated application of the front and rear brakes may result in a fall for both the rider and the bike.

Prompted in part by the above statistics, the United States Department of Health, Education and Welfare has proposed standardized stopping distance criteria for bicycles for use by children under 16 years of age, with the strictest criteria being applicable to bicycles designed for a ground speed of 15 m.p.h. or greater. For the latter category, the stopping distance based on a rider weight of 150 lbs. is 15 feet when the brakes are applied from a velocity of 15 m.p.h. on a dry, level, paved surface. Greater stopping distances are allowed for heavier riders at the rate of 1 ft. per 10 lbs. of rider weight above 150 lbs. Although these criteria are designed to apply to bicycles intended for use by children, they would appear to be useful criteria for all bicycles that are to be used by any riders who are inexperienced. This point is emphasized because although highly experienced cyclists may be able to stop within the proposed criteria, there is a vast number of cyclists over the age of 16 who are by no means highly experienced in using hand brakes in spite of the fact that they may ride their bicycles quite frequently.

EXISTING TYPES OF BICYCLE BRAKES

Bicycles designed for ground speeds in excess of 15 m.p.h. are generally of the racer type which have variable speed drives, as for example, 3, 5, and 10 speeds, and are generally equipped with hand-operated caliper type brakes. These caliper brakes are usually operated by pull cables which are actuated from the handle bars of the bicycle to operate the front and rear brake units independently. Such caliper brakes are of two types — center pull and side pull. In either type of brake, when the cable is pulled by the handlebar actuator, the brake shoes at the caliper unit are brought into braking engagement with the rims of the bicycle wheels.

A second general type of caliper bicycle brakes are those which are actuated by hydraulic means, as proposed for example in Turner U.S. Pat. No. 869,948, Freeland et al. U.S. Pat. No. 3,338,337, and Shimano et al. U.S. Pat. No. 3,544,334. The Turner brake suggests the utilization of a hydraulic system which includes a compressor bulb that is mounted on the bicycle handlebar and is in communication, through a length of tubing, with an expansion bulb at the rear wheel caliper brake unit. Compression of the compressor bulb causes expansion of the expansion bulb, which is interposed between the arms of the caliper brake, so that the brake shoes are forced into engagement with the bicycle rim.

The Freeland et al. hydraulic brake proposes the use of hydraulic cylinders and pistons instead of the bulbs of Turner. This hydraulic system shares a common deficiency with the standard cable pull caliper brake units in that it requires the cyclist to coordinate the application of braking to the front and rear wheel brake units to accomplish a maximum braking effect without tumbling. In many cases, particularly in a panic stop situation, the inexperienced cyclist may accidentally apply a badly proportioned amount of braking to either wheel or may apply a braking force only to the front wheel, with the result that an unacceptable, extended braking distance will result or the cyclist may end up taking a tumble.

As recognized in the Shimano et al. patent, effective braking requires the proper utilization of both the front and rear bicycle brake units. To this end, Shimano et al. discloses means for applying a braking force simultaneously to the front and rear wheel brake units, thus avoiding the need for conscious coordination on the part of the cyclist in the application of braking force to the front and rear wheel. Shimano teaches the application of a greater braking force to the rear wheel than to the front wheel, although braking force is applied to both wheels, so as to prevent loss of balance which might result in tumbling of the cyclist over the bicycle.

While the manner of application of the braking force to the bicycle rims plays a major role in the braking of a bicycle, the integrity of the components also plays a role in proper braking. In the very expensive bicycles, the various components are of extremely high quality and integrity; however, in the less expensive bicycles, component integrity is somewhat less. One problem is introduced because bicycle wheel rims tend to exhibit lateral alignment irregularities or "run-out,"which situation results in irregular rotational trueness of the wheel as it rotates about its axis. While run-out may be minimized by proper adjustment of wheel spoke tension, it is not unusual, particularly in a bicycle operated and maintained by a young cyclist, to have wheel runout of a substantial degree.

When a bicycle equipped with caliper type brakes has a substantial degree of run-out, the caliper brakes — which are usually equipped with strong restoring springs about the pivot links of the brake unit — do not respond quickly to the lateral movement of the rim. As a result, the force applied by the brake shoes on either side of the rim may not be uniform during the application of a braking force. This is especially true in the cable-operated type caliper brakes, in which the tension on the cable tends to keep the brake unit aligned with the cable.

Moreover, where bicycles have a substantial degree of run-out, cyclists usually tend to increase the distance between the rim and brake shoes in the unactuated position more than is desirable, to allow the wheel to rotate without contacting the brake shoe in order that there is no interference therebetween during riding. This type of adjustment may interfere with proper braking if the distance between the rim and the brake shoes is a substantial portion of the stroke of the brake unit.

BRIEF DESCRIPTION OF THE DRAWINGS

FIG. 10 is a side elevation view similar to a portion of FIG. 7, with certain elements removed for clarity of illustration, showing another caliper link embodiment, together with a rim wiper;

FIG. 11 is a sectional view of the brake shoe element and wiper taken generally along the line 11—11 in FIG. 10;

FIG. 12 is a sectional view taken generally along line 12—12 in FIG. 10;

FIG. 13 is an exploded view of another embodiment of a caliper brake link according to this invention;

FIG. 13a is an enlarged sectional view taken generally along the line 13a–13a in FIG. 13;

FIG. 14 is an enlarged end view, with certain portions in cross section and certain elements removed for clarity of illustration, showing a rear wheel expansion capsule, pressure plates and capsules constraining means, such as may be used with the caliper brake unit of FIGS. 6 and 7;

FIG. 15 is an enlarged side elevation view, with certain portions in cross section, showing an alternate actuator assembly operated by the bicycle chain drive system;

FIG. 16 is a sectional view taken generally along the line 16—16 in FIG. 15;

FIG. 17 is a perspective view of a two-piece mounting member;

DESCRIPTION OF A PREFERRED EMBODIMENT

Figure 1:
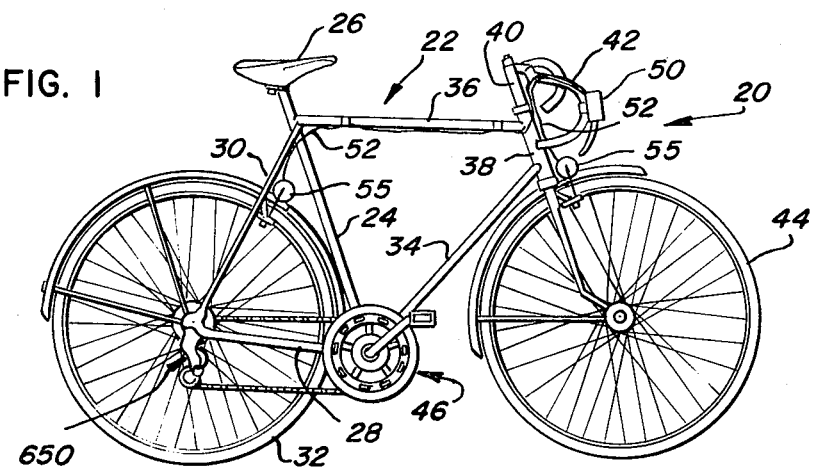
FIG. 1 is a side elevation view of a bicycle equipped with the brake system of the present invention.

While this invention is susceptible of embodiment in many different forms, there is shown in the drawings and will hereinafter be described in detail a preferred embodiment of the invention, and modifications and alternatives thereto, with the understanding that the present disclosure is to be considered as an exemplification of the principles of the invention, and is not intended to limit the invention to the embodiments illustrated.

INTRODUCTION AND GENERAL THEORY OF OPERATION

The brake system of the present invention is of the hydraulic type, and in the embodiment illustrated caliper type brakes are used for applying braking forces to the front and rear wheels of a bicycle. However, unlike the prior art, the present invention includes means for providing a greater braking force to the front wheel than to the rear wheel. Specifically, it has been found that for good results the ratio of braking force between the front and rear wheels should be in the range of about 52:48 to about 70:30, preferably about 55:45.

Although it has heretofore been generally accepted that the greater braking force should be applied to the rear brake to prevent tumbling, as in the Shimano et al. patent referred to above, it has surprisingly been found that, particularly for panic stop situations, it is desirable to provide a greater braking force to the front wheel than to the rear wheel. This method of brake application not only does not result in imbalance to the bicycle rider, but provides a high degree of braking with the result that the braking distance is less than would be achieved by a standard caliper type brake when used with an inexperienced rider.

While not wishing to be bound by any particular theory of operation, it is believed that greater braking force may be applied to the front wheel than to the rear wheel because of a forward shifting effect of the center of mass of the cyclist as the brakes are applied. As a result of this forward shifting effect, a greater weight is presented to the front wheel, and the frictional reaction force between the front wheel and the ground will be increased. This increase in reaction force allows a greater braking force to be applied to the front wheel without causing that wheel to "lock up" (that is, stop rotating completely) and start skidding, which would interfere with the rider's control of his bicycle. The reason for this is that the greater frictional stopping force applied by the ground against the front wheel in this situation permits a greater braking force to be applied to slow up and stop the rotation of that wheel without producing skidding.

The term "braking force," as used in this specification, refers to the force which is generated by the interaction of the brakes with the bicycle wheels, that is, the force tending to impede rotation of the wheels. The term "stopping forces" refers to those forces or sources of energy dissipation which are independent of the braking force. These forces include resistance of wheel bearings, wind resistance, flexural deformation of the tires as the bicycle moves, frictional force between the ground and tires, and the slope of the terrain on which the bicycle is ridden.

During tests run on a bicycle equipped with a braking system in accordance with the present invention, it was found that a 190 lb. rider could stop a bicycle traveling at 15 miles per hour in about 11 to 12 feet on an asphalt surface — in other words, a distance well below the proposed criteria distance of 19 feet for a rider of the indicated weight. Even shorter stopping distances were achieved when the surface was sealed concrete.

Moreover, when greater braking force is applied to the front wheel as indicated, it has been observed that only the rear wheel will lock up in a panic stop situation. In contrast to the rear wheel, the front wheel continues to rotate during the braking of the bicycle, so that there is no loss in steering ability during stopping.

As will be described in detail below, the brake system of this invention is designed to be operated by a single actuator located on the handlebar which provides for power input to both the front and rear wheel brakes. This obviates the need for manual brake coordination, which is particularly difficult for youthful riders. Accordingly, it is possible with the present invention to provide a means for quickly braking a bicycle independent of the skill of the rider, which is particularly important in panic stop situations.

GENERAL BRAKING SYSTEM

FIG. 1 shows a bicycle 20 of the racer or touring type which is equipped with the caliper type brake system of the present invention.

Bicycle 20 includes a frame 22 which comprises a generally vertical main support member 24 upon which a seat 26 is mounted at the upper end thereof, and from which a pair of horizontal, spaced apart, rear wheel stays 28 extend at the lower end thereof. A pair of downwardly inclined stays 30 extend from main support 24 below the seat to the outer ends of stays 28, to define a generally triangular shaped rear wheel frame portion. A rear wheel 32 is rotatably mounted at the apex of the stays 28 and 30 and supported thereby.

An upwardly inclined support member 34 extends forwad from the bottom of main support 24 and a generally horizontal support 36 extends forward of the main support beneath the seat. Supports 34 and 36 are attached to a journal 38 through which passes a front wheel fork 40. A handlebar 42 is attached to the top of the stem of fork 40, and a front wheel 44 is rotatably mounted within the fork at the bottom thereof.

Bicycle 20 is equipped with a multi-speed chain drive system 46, as is known in the art, to provide a means for driving the bicycle. The drive system is of the overrunning type, and provides no braking force for the bicycle.

The present system of the present invention comprises an actuator assembly 50 which is mounted on the handlebar and arranged to deliver hydraulic fluid under pressure to caliper type brake units 55 which are mounted adjacent each wheel. The hydraulic fluid is delivered through two separate, independently replaceable, hydraulic circuits, (one for the front wheel and one for the rear wheel), which include lengths of tubing 52 suitably secured to frame 22, as by tape or ring clips. Rear brake unit 55 is mounted between stays 30 and main support 24 adjacent the top portions of the stays and main support, so that the area to the rear of stays 30 is clear of any obstruction. Thus there is a free space behind stays 30 where a carrier for packages or for an infant may be mounted. The front brake unit is mounted on fork 40 adjacent the bottom of journal 38.

BRAKE ACTUATOR ASSEMBLY

Figure 2:
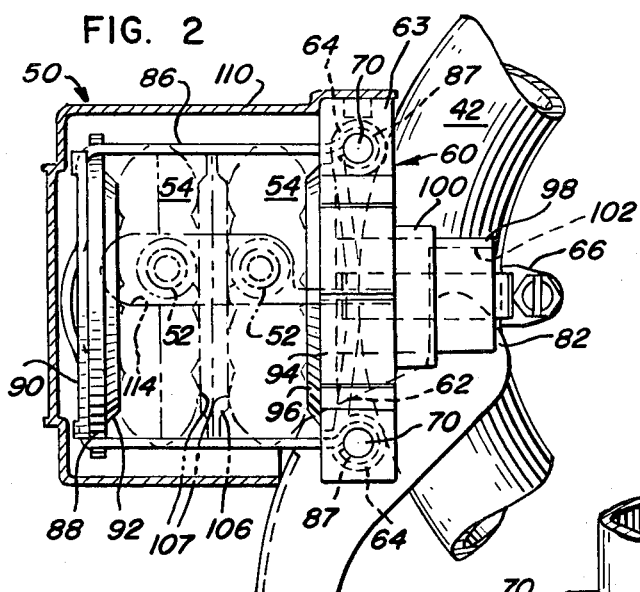
FIG. 2 is an enlarged, side elevation view of the brake actuator unit of the present invention on the handlebar of a bicycle, with certain portions in cross section for clarity of illustration.
Figure 3:
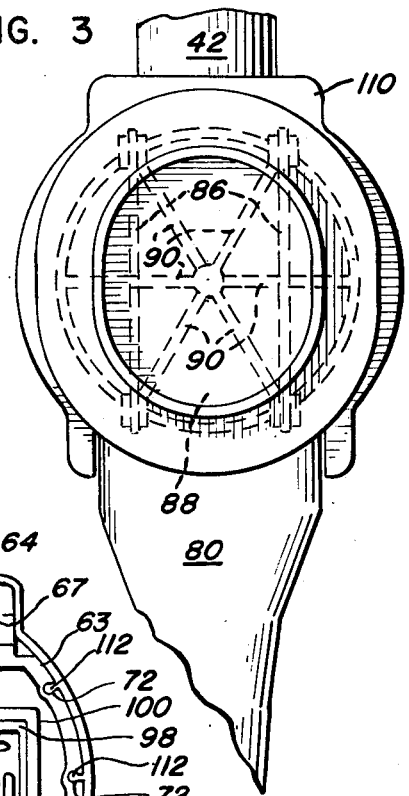
FIG. 3 is a front elevation view of the actuator of FIG. 2.

Actuator assembly 50 (FIGS. 2, 3, and 4) includes two hydraulically separate expansible capsules 54 filled with hydraulic fluid which are connected through respective separate tubes 52, as described in greater detail below, to the front and rear wheel brake units. The two capsules, referred to as compressor capsules, are of a generally elliptical shape in vertical cross section, as seen in FIG. 2, and are generally circular in transverse cross section, as seen in FIG. 3.

Handlebar 42 illustrated in the drawings is of the drop or turned down type generally referred to as a racer handlebar, and is used for illustrative purposes only. The braking system of the present invention may e utilized on straight handlebars as well. Actuator assembly 50 includes a base 60 which is conveniently formed in two parts, a metallic plate 62 and a plastic collar 63. Plate 62 functions as a mounting member and is generally rectangular in shape and provided with turned eyelet portions 64 at its end to provide mounting journals. The midportion of plate 62 is formed with a flexure towards handlebar 42 to provide a bearing surface for engagement with the handlebar. Mounting plate 62 is provided with a suitable adjusting clamp 66 which secures actuator assembly 50 to handlebar 42.

Collar 63 is generally cylindrical in shape and bifurcated vertically at 63a so that the collar may be slid over plate 62. Each vertical end of collar 63 is provided with a bore 67 which is aligned with the respective eyelet journal 64 of plate 62 to define a passageway therebetween, in which is positioned a pin 70 to secure collar 63 to mounting plate 62. The curved peripheral portions of collar 63 are provided with spaced apart receiving notches 72 which are utilized to mount a cover, to be described below.

Figure 4:
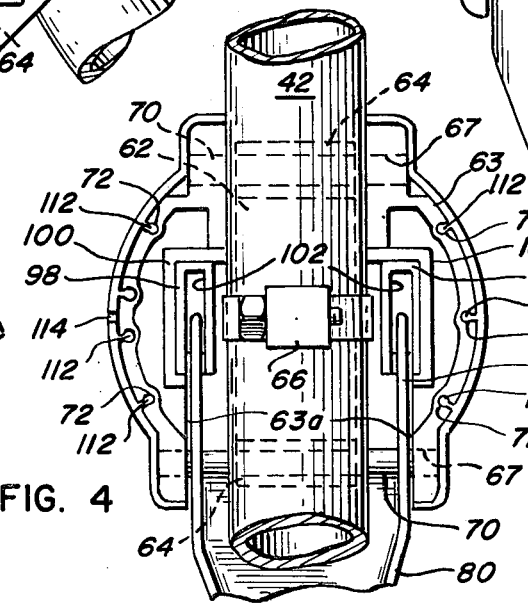
FIG. 4 is a rear elevation view of the actuator of FIG. 2.

Actuator assembly 50 is operated by a lever 80 having a U-shaped cross section and which is pivotally mounted on lower pin 70 to provide a fulcrum for the lever. The upper end of lever 80 is bifurcated to straddle handlebar 42, as best illustrated in FIG. 4. A cam portion 82 is defined by each arm of the upper end of lever 80 so that as lever 80 is pulled towards handlebar 42, cam portions 82 move forward relative to plate 62.

Capsules 54 are mounted in pancake-like fashion within actuator assembly 50 by means of a pair of generally U-shaped retainers 86 which are provided with eyelets 87 at their free ends so that the retainers may be mounted on upper and lower pins 70. The legs of the U-shaped retainers act as side walls or restraints and the cross members thereof act as top restraining members to form a generally concave mounting zone for compressor capsules 54. Retainers 86 may be made of wire or other suitable filaments which are strong in tension but which will yield to transverse impact loading, such as impacts encountered when the bicycle falls and the actuator assembly 50 strikes the ground. In this manner, the overall integrity of the actuator assembly may be maintained while providing a safe and reliable structural unit.

The cross member of each U-shaped retainer 86 passes over and confines a fixed pressure plate 88 which acts as a backup during the compression of compressor capsules 54. Pressure plate 88 is generally circular in shape and provided with reinforcing ribs 90 on one surface thereof which radiate from the center of the pressure plate (FIG. 3). The other surface of pressure plate 88 is provided with a disc-like protrusion 92 which bears against adjacent capsule 54 to facilitate the compression of the two capsules, as will be described in greater detail below.

An axially slidable pressure plate 94 is positioned at the opposite end of the actuator adjacent mounting plate 62 and is utilized to compress capsules 54. Pressure plate 94 is generally circular in cross section and provided with a disc-like protrusion 96 on the surface thereof facing capsule 54. The opposite surface of pressure plate 94 is provided with two elongated, generally rectangular shaped protrusions 98 which extend rearwardly through guide portions 100 formed in the facing surfaces of the bifurcated portion of collar 63. Each protrusion 98 is provided with a generally rectangular shaped cut-out 102 which opens at the bottom surface to receive one of the cam portions 82 of lever 80. In this manner, as lever 80 is pivoted, cam portions 82 force pressure plate 94 axially to cause capsules 54 to be compressed.

Interposed between the two compressor capsules 54 is an optional slidable pressure plate 106 which is freely movable in response to compression and expansion of the compressor capsules.

Since mounting plate 62 is provided with a flexed midportion and eyelet journals at each end thereof, the plate is maintained in contact at three points with the handlebar, so that as lever 80 is rotated counterclockwise as viewed in FIG. 2, the lower journal 64 and lower pin 70 act as a reaction member against handlebar 42 to provide support during actuation of the actuator 50. In addition, since lever 80 is bifurcated and operates on movable pressure plate 94 at two spaced apart locations on either side of the handlebar, a balanced loading is provided on the actuator which militates against relative rotation between actuator assembly 50 and handlebar 42 and also provides a uniform loading on the movable pressure plate.

The actuator assembly is enclosed within a generally cylindrical shaped housing 110 which is made from a flexible plastic such as polypropylene. Housing 110 is provided with releasable mounting protrusions 112 (FIG. 4) which may be snapped into notches 72. In this manner, should the bicycle fall and actuator assembly 50 strike the ground, cover 110 will yield or may pop off and the filament retainers 86 will yield, which will militate against damage to the actuator assembly. Cover 110 is provided with an elongated longitudinal mounting slot 114, which opens to the free end of the cover (shown in phantom line on FIG. 2) to enable the cover to be spread for mounting on collar 63. Slot 114 is enlarged at its opposite side to provide an access opening through which hydraulic tubes 52 extend.

HYDRAULIC CIRCUITS

Figure 5:
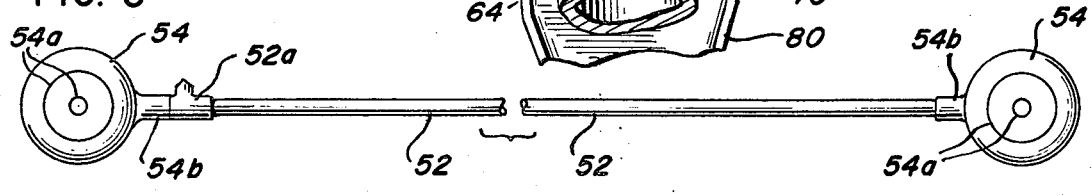
FIG. 5 is a side elevation view of one of the hydraulic circuits included in the brake system of the present invention.

FIG. 5 shows a typical hydraulic circuit for use in the present invention. It includes two similar expansible capsules 54, which may be made by a blow-molding process of a suitable elastomeric material chosen for durability, strength, and maintenance of properties through a wide range of temperature. Rubber, synthetic rubber, and a wide range of plastic materials may be used, with ethylene vinyl acetate being preferred.

Each capsule is generally circular in shape in the plane shown in FIG. 5, and is generally elliptical in cross section in the plane perpendicular thereto. The surfaces of each capsule define depressions 54a which are concentric and circular in shape. This construction facilitates compression and expansion of each capsule through a range varying from about ¼ inch to about ⅝ inch. Preferably ⅜ inch. The result is that the total movement of pressure plate 94 during actuation in a preferred embodiment is about ¾ inch.

Each capsule 54 has an integral connecting spud 54b to which the hydraulic tubing 52 is permanently sealed. Tubing 52 is provided with a filling Tee 52a at one end thereof. Tubing 52 is permanently sealed to each capsule spud 54b by any suitable method such as heat sealing or spin welding, the latter being preferred. In the spin welding process, the tubing 52 or the capsule 54 is rotated at a high speed while the tubing is pressed into the interior of spud 54b. The high speed of rotation causes friction to heat the plastic material of the tubing or the spud of the capsule, or both, causing the plastic to flow. The relative rotation is quickly stopped and the two parts are permanently fastened together as the plastic cools. To use this method, the plastic tubing must be of a material compatible with the process and with the material of the capsules; tubing of polyethylene is suitable for use with capsules made of ethylene vinyl acetate.

Each hydraulic circuit is filled with a suitable hydraulic fluid which has the characteristics of having a relatively low viscosity throughout a wide temperature range, not freezing at ordinary ambient winter temperatures, and being fireproof and inexpensive. A preferred fluid is a mixture of water with ethylene glycol to assure against freezing. Methyl alcohol or ethyl alcohol and water, as well as other liquids, may also be used. The term "hydraulic fluid" as used herein refers not only to liquids but also to gases, although a liquid fluid is preferred since gases tend to vary appreciably in volume in response to temperature changes. The method by which each hydraulic circuit is charged will be described in greater detail below.

Protrusions 92 and 96 on fixed and movable pressure plates 88 and 94, respectively, are of a diameter such as to produce the collapsing of most of the volume of each capsule without the necessity of compressing the peripheral portions of the capsules. The peripheral portions of the capsules require a greater force to collapse because they tend to act similar to double leaf springs. Thus the utilization of protrusions 92 and 96 permits a greater stroke for the movable pressure plate without a substantial increase in the force necessary to overcome the effect of the peripheral portions of the capsules to collapse the capsules. In a typical embodiment, the full diameter of a capsule is about 2 inches, while the diameter of the projections is about 1½ inches. Each projection may extend about 3/32 inch towards the capsules. In a similar fashion, floating pressure plate 106, if used, is also provided with projecting surfaces 107 to bring about a more nearly complete collapse of both capsules, thus augmenting the liquid displacement during operation of the brake.

The capsules at the front and rear brake units 55, referred to as expansion capsules, are normally subjected to external compression, as will be described in greater detail below, so that the two compressor capsules 54 in the actuator assembly will expand when lever 80 is released. In this manner, movable pressure plate 94 is returned to an abutting position against plate 62 and readied for another braking cycle.

Inasmuch as both compressor capsules 54 are free to float, the force generated on compressor capsule 54 adjacent movable pressure plate 94 is transmitted equally to the other compressor capsule 54. As a result, the pressure of the hydraulic liquid within the two capsules is substantially identical, subject only to insignificant variations in tolerance sizes of the two capsules when the capsules are of the same diameter.

It is possible to provide for different pressures in the two hydraulic circuits so as to achieve greater braking force at the front wheel, by making the rear wheel compressor capsule larger in diameter than the front wheel compressor capsule and utilizing the free floating pressure plate 106. In this manner, the pressure within the front wheel brake circuit will be increased relative to the rear wheel circuit pressure. While this method of providing greater braking force to the front wheel is possible, other methods, to be described below in greater detail, are preferred since certain economies of production may be realized by utilizing capsules of identical size.

Since the hydraulic circuits utilized in the present invention are independent and utilize no seals which may wear out, the present invention possesses good operational integrity and durability, which results in a safety factor which must be considered in any brake system. A hydraulic circuit according to the present invention has been tested for quality assurance, and has maintained its integrity through a cycling life of several hundred thousand braking cycles, or in other words the equivalent of many years of operation at a very heavy rate of year-round use. Nonetheless, should one of the hydraulic circuits fail, as by a leak in one of the capsules or tubing, which would cause the hydraulic fluid to drain therefrom, the remaining hydraulic circuit would still be operable and the throw which may be generated by lever 80 is sufficient to compress either of the compressor capsules to provide braking force for the bicycle.

METHOD OF CHARGING THE HYDRAULIC CIRCUITS

Figures 6, 7, 8, 9:
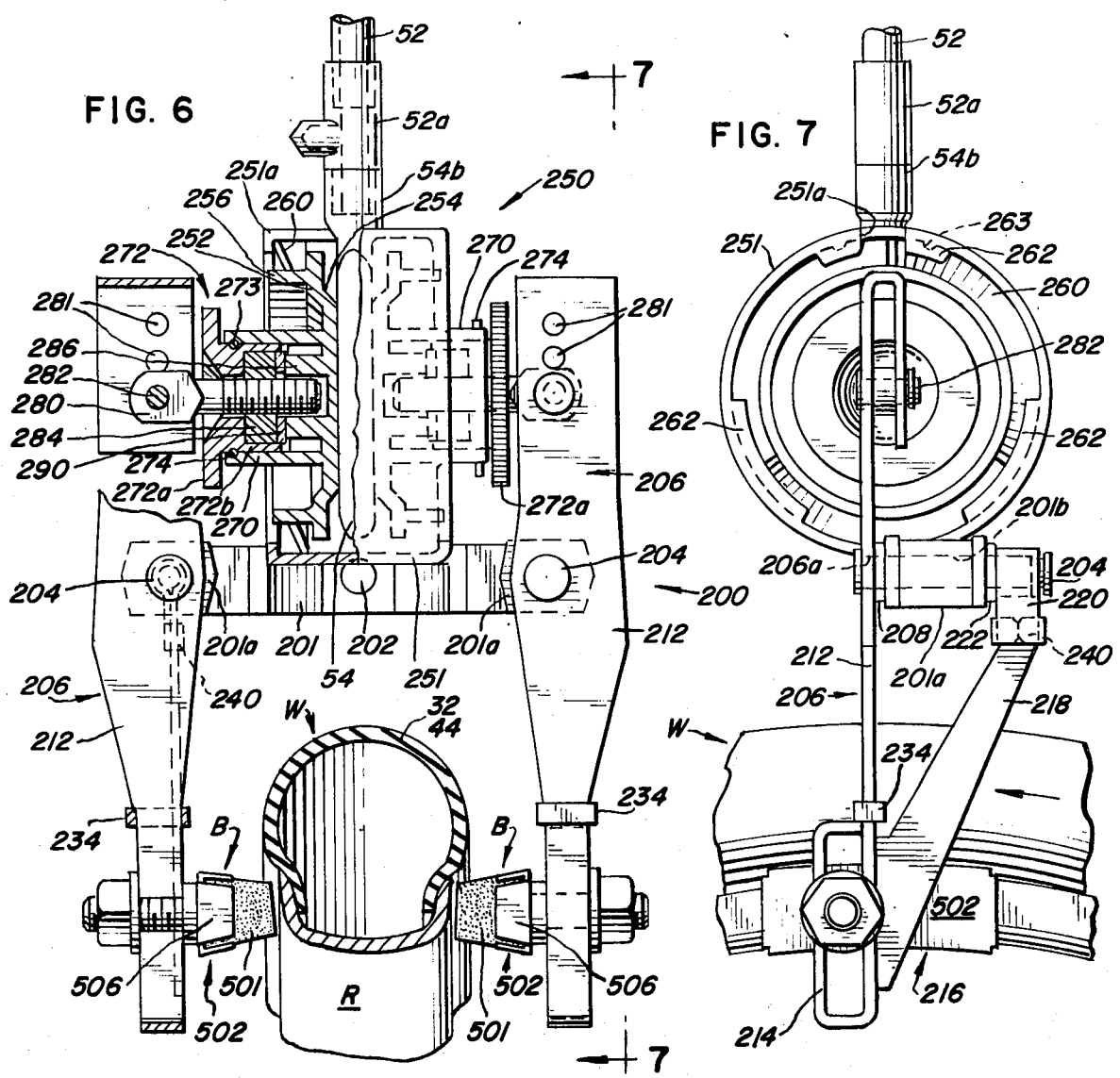
FIG. 6 is an enlarged front elevation view of one of the caliper brake units of the brake system of this invention, with certain portions broken away for clarity of illustration.
FIG. 7 is a side elevation view taken from the right-hand side in FIG. 6.
FIG. 8 is an elevation view of a link blank for forming one of the caliper brake link embodiments.
FIG. 9 is a schematic view of the apparatus for charging the hydraulic circuits of the brake system of this invention.

FIG. 9 shows a schematic representation of the apparatus for charging the hydraulic circuits of the present invention. To charge the hydraulic circuit, a filling tube 120 is inserted into the trunk of Tee 52a. Filler tube 120 is connected to a vacuum source 122 through a three-way valve 124 and suitable tubing 126 so that a partial vacuum is drawn within the hydraulic circuit. Filling tube 120 is then valved to a reservoir 128 of hydraulic fluid of the type described above, which is maintained at a pressure in the range of about 20 to about 60 p.s.i.g., preferably about 40 p.s.i.g., through valve 124 and tubing 129 to charge the circuit.

During the charging operation, each capsule 54 is placed between a sizing gauge 130, so that when the hydraulic fluid is injected, each capsule will be expanded to a predetermined dimension consistent with the volume requirements of the circuit. The combined effect of the two sizing gauges 130 is predetermined by the desired stroke and volume displacement to be achieved in each of the hydraulic circuits. In a typical hydraulic circuit, the sizing gauges 130 are designed to admit sufficient fluid into the hydraulic circuit so that a volume corresponding to having one capsule substantially collapsed and the other capsule at its fully expanded position will be admitted.

After the hydraulic fluid is injected, the trunk of the filling Tee 52a is pinched off and permanently closed, as by heated clamps 134 which engage and cut the Tee below the filling tube 120 to pinch, seal, and cut off the trunk of the filling Tee in a single operation. Thus, there are no moving parts or seals in either of the hydraulic circuits utilized in the present invention, thereby militating against the possibility of leakage. Moreover, due to the construction of each of the hydraulic circuits, the cost of replacing an entire circuit is quite low when compared to other hydraulic circuits using pistons and seals.

While heated clamps 134 function well to pinch, seal and cut off the trunk of Tee 52a when the hydraulic fluid is a non-oleaginous fluid such as a mixture of water and ethylene glycol, heated clamps should not be used with oleaginous fluids such as a silicone oil or petroleum oil. It has been found that oleaginous fluids will form a film on the internal walls of the filling Tee which hinders the formation of a seal by heating. Therefore, another method such as pinching, cutting off and capping should be used when it is desired to use an oleaginous fluid in the hydraulic circuit.

BRAKE ACTUATOR UNITS

FIGS. 6 and 7 show a caliper type brake 200 in accordance with the present invention which is typical in construction for the front and rear wheel brakes.

Brake 200 includes a horizontally disposed, generally U-shaped, mounting member 201 which positions brake 200 on the bike frame by means of bolt 202 which extends through the center of the base portion thereof. As already explained above, the rear brake is mounted on stays 30 and the front brake is mounted on fork 40. Each leg 201a of the mounting member 201 defines a bore 201b through which passes a pivot pin 204. An actuator link 206 is pivotally mounted at its midportion by each pin 204 which extends through a pivot hole 206a. A bushing 208 formed of nylon or other plastic material is interposed between leg 201a and link 206 to facilitate free rotation of the link.

While the present invention is adaptable for use with a standard type pivot link, the pivot link embodiments to be described are economically produced, and possess the desired strength with a substantial saving in weight. Each link 206 consists of a generally flat pivot member 212 which lies in a plane perpendicular to the bicycle wheel W. The pivot member is of sufficient strength for the application of braking force, but since it is a thin flat member it does not possess sufficient strength alone to absorb the resulting force generated by the engagement of the brake shoe B with the wheel rim R.

The lower end of each pivot member 121 defines a mounting slot 214 in which is adjustably mounted a brake shoe holding element 216. The upper end of each pivot member extends beyond pin 204 to provide a moment arm which is acted upon by an actuator cell 250, to be described in greater detail below, to place brake shoe B in engagement with wheel rim R. Extending upwardly in an inclined fashion from the portion of the pivot member that defines slot 214 is a tension member 218 which defines journal 220 at its free end.

The center line of journal 220 is aligned with pivot hole 206a in pivot member 212. Pin 204 extends through journal 220 to support the tension member during the application of braking force. To provide for the free rotation of each tension member 218, a nylon bushing 222 is interposed between journal 220 and leg 201a.

Link 206 may be manufactured by several methods including die casting, single-piece stamping, or multiple-piece stamping, as will be described in greater detail below.

ACTUATOR CELL

Actuator cell 250, interposed between the upper ends of links 206, includes a generally cylindrically shaped plastic housing 251 in which is positioned one of the expansion capsules 54. Housing 251 is provided with a suitable slot 251a to allow spud 54b to extend outwardly therethrough.

Two plastic pressure plates 252, one on each side of the expansion capsule, are positioned within housing 251 and carry disc-like protrusions 254 similar to those described above for facilitating expansion and collapsing of the expansion capsule. The surface of each pressure plate 252 on the opposite side from capsule 54 is provided with a first annular protrusion 256 spaced slightly inwardly from the periphery thereof.

An annular biasing means in the form of a three-peak wave washer spring 260 is interposed between inwardly directed, angularly spaced tabs 262 on each edge of housing 251 and each pressure plate 252 to bias the plates inwardly into engagement with the expansion capsule. Each wave washer 260 is positioned against rotation with a peak between a pair of angularly spaced positioning tabs 263 which are on the inner surface of housing 251 (FIG. 7). Preferably wave washer springs 260 are designed to collapse the expansion capsule completely when the actuator assembly is in its ready condition.

A second annular protrusion 270 extends outwardly from each pressure plate 252 to provide a means for mounting an adjusting element or collar 272. Collar 272 is generally circular in cross section and includes a knurled portion 272a and a reduced diameter portion 272b. Collar 272 is provided with a peripheral annular groove 273, which extends around the reduced diameter portion thereof and in which are received the legs of a U-shaped clip ring 274. The legs of each clip ring 274 are inserted through a pair of openings in protrusion 270 to rotatably mount the respective collar 272 thereon.

An alternative construction of the collar 272 and protrusion 270 may be utilized to eliminate clip ring 274. The alternative structure is of the snap fit type in which protrusion 270 is provided with an annular ridge about its periphery in place of the openings for the clip rings. The collar is modified by the addition of an annular protrusion which may slide over protrusion 270, and includes an annular snap-in groove which receives the annular protrusion on protrusion 270.

Each link 206 is operated by actuator cell 250 through the movement of an actuator member, spade bolt 280, which is threadably engaged (through an arrangement of parts to be described) with its respective collar 272 at one end and is rotatably connected with its link 206, through pin 282 inserted in one of a plurality of mounting holes 281, at the upper end of the link. Each collar 272 engages a nut 284 which is threaded on spade bolt 280 so that as collar 272 is rotated, the distance between the brake shoe B and rim R at the other end of link 206 is adjusted. Further, by rotating each collar 272 to shorten the effective length of its associated spade bolt, the brake shoes B may be moved to a clearance position for removal of wheel W.

A thrust washer 290 is mounted on spade bolt 280, between nut 284 and a third annular protrusion 286 on plate 252. When expansion capsule 54 expands, each associated pressure plate 252 is moved outwardly, protrusion 286 pushes against thrust washer 290, the washer pushes against nut 284, spade bolt 280 moves the upper end of link 206 outwardly, and brake shoe B at the other end of the link is moved into engagement with rim R of bicycle wheel.

the hydraulic actuator cell 250 is thus in free floating relationship with links 206, since there are no means biasing the links themselves, except for wave washer springs 260. Thus, the entire assembly may freely flow the run-out of wheel rim R, which provides for enhanced braking of any wheel rims which are subject to substantial run-out.

BRAKE ACTUATOR LINKS

FIG. 8 shows a single-piece blank 300 which may be utilized to form link 206 illustrated in FIGS. 6 and 7.

Blank 300 includes a flat, generally rectangular shaped, elongated portion 331 which is provided with a pivot hole 332 at its midportion and which when folded at fold lines 333 provides a mounting slot 214 (FIG. 7). The folded over portions are maintained in position by means of wing tabs 334 which are wrapped around the main portion of the pivot link (tabs 234 in FIG. 7).

The upper end of pivot portion 331 defines a downwardly opening U-shaped moment arm when folded about fold lines 335. A plurality of locating holes 336 are provided at various distances from pivot hole 332 to provide for varying the length of the moment arm acted upon by actuator cell 250. This provides a means for applying greater braking force to the front wheels by utilizing a set of locating hols at a greater distance from the pivot pin 204 than that utilized on the rear brake unit.

Upwardly extending inclined portion 338, when folded along vertical fold line 339, extends at right angles to flat portion 331 to form tension member 218 (FIG. 7). The upper end of member 338 has a wraparound portion which terminates in a pair of wing tabs 340. When tension member 218 is in place, tabs 340 grasp the main portion of member 338 to form journal 220 (FIG. 7).

Another link 306 is illustrated in FIG. 10. It is of two-piece construction, and the parts thereof corresponding to link 206 are designated by adding 100 to the respective part designations. In this embodiment, members 312 and 318 may be stamped and spot welded to provide the finished link 306.

A still further link 406 is illustrated in FIGS. 13 and 13a. Link 406 is of two-piece construction, and includes a pivot member 412 and a tension member 418. Pivot member 412 is a generally flat piece which may be conveniently formed from sheet metal by a stamping process. The upper end of pivot member 412 is turned to provide a downwardly opening U-shaped portion 412a which includes a plurality of mounting holes 481 at various distances from the pivot hole 406a the midportion of the pivot member.

The lower end of pivot member 412 is turned to provide a brake shoe mounting slot 414. The free end 430 of this slot defining portion is formed with a generally S-shaped configuration to provide a bearing surface 431 which is in slidable, abutting relationship with the flat portion of the pivot member. In this manner, the slot defining portion of the pivot member acts as a cantilever compression spring when inserted into engagement with tension member 418, to be described below.

Tension member 418 comprises a generally triangular shaped main portion which defines an eyelet journal 420 at one apex. The end of tension member 418 opposite journal 420 includes an elongated, vertical edge projection 436 and a small, vertical projection 438 extending outwardly from the main portion to define a generally U-shaped receiving zone into which the slot defining portion of the pivot member is inserted.

To facilitate engagement of the pivot member with the tension member, elongated ridges or projections 440 are provided in the vertical walls of the slot defining portion of the pivot member. These projections 440 are grasped by projections 436 and 438 which are inwardly inclined to provide for positive engagement therebetween (FIG. 13a). Additionally, the portion of pivot member 412 adjacent the S-shaped end 430 is provided with an elongated projection 442 which locks into a cutout 444 in tension member 418 adjacent projection 438 (as best seen in FIG. 13a) to positively position members 412 and 418.

MEANS FOR APPLYING GREATER BRAKING FORCE

Turning now to the various means for applying a greater braking force to the front wheel than to the rear wheel, these may include any one of several means or a combination thereof.

As described above, compressor capsules of different diameters may be used. Alternatively, the pressure in the front wheel brake circuit may be increased by reducing the area of engagement between the front compressor capsule and the pressure plates on each side of the capsule, with the result (since the force applied remains the same) that there is an increase in hydraulic pressure in the front circuit.

The remaining means for producing a greater braking force at the front wheel brakes may be achieved by any one of several modifications of the brake actuator unit, which broadly fall in the category of either mechanical or hydraulic modifications.

As previously described, each link 206, 306, 406 is provided with a plurality of mounting holes 281, 381, and 481. These mounting hols are at various distances from the pivot point of the actuator link. If the spade bolt 280 of the front wheel brake unit is mounted at a mounting hole farther from the pivot point than the mounting hole utilized at the rear wheel brake unit, the moment arm for the front brake unit will be larger than that for the rear brake unit. The braking force applied by the front wheel brakes is thus larger than that applied by the rear wheel brakes.

A further method of providing a greater braking force for the front wheel brake is through the use of a larger effective hydraulic surface area at the front wheel expansion capsule than at the rear wheel expansion capsule.

The term "effective hydraulic surface area" as used in this specification and the claims refers to the resultant surface area that is used to calculate the force exerted by the pressurized fluid in an expansible pressure vessel upon a given size pressure plate placed in engagement with the vessel after taking into account the stress effect resulting from the particular shape and resistance to deformation of the walls of the pressure vessel. Where the surface of the vessel is larger than the pressure plate area and the pressure plate is resiliently biased against the surface of the vessel, the effective hydraulic surface area acted upon by the pressurized fluid will vary inversely as a function of the stress in the vessel walls.

By way of example, when the vessel is nearly collapsed, the walls of the vessel around the pressure plate may bulge beyond the plane of the plate, and the walls around the plate then function in a manner similar to tension springs to assist in creating an outward foce upon the plate that is greater than the product of the hydraulic pressure and the pressure plate area. When the vessel is at an intermediate expansion position, the effective hydraulic surface area will equal the pressure plate area. And, finally, as the vessel approaches its extreme expanded position, the stress in the walls of the vessel again acts as a tension spring but operating in the opposite direction, so that the force exerted on the plate is less than the product of the pressure and the plate area.

The term "effective hydraulic force," as used herein, refers to the force exerted on a pressure plate by an expansible pressure vessel calculated by multiplying the effective hydraulic surface area by the pressure within the vessel.

A greater effective hydraulic surface area may be accomplished in several ways. One of these is to increase the diameter of the front wheel expansion capsule in relationship to the rear wheel expansion capsule, with a corresponding increase in the surface area of the pressure plate in contact with the front wheel expansion capsule. This is not a preferred expedient, however, since as previously indicated it is desirable as a practical matter to use expansion capsules which are of the same size. A similar effect may be achieved by using larger diameter protuberances 254 on the front wheel pressure plates 252 (FIGS. 6 and 14) than on the rear wheel pressure plates which will, of course, result in an increase in the effective hydraulic force generated by the front wheel brake unit.

Still another means for apportioning greater braking force to the front wheel brake utilizes the effect of the stress created in the rear wheel capsule to vary the effective hydraulic force generated by the rear expansion capsule. As shown in FIG. 14, by adding an annular channel section 360, which may be positioned within housing 251, the leaf spring effect created by the peripheral edges of the capsule may be overcome. Annular channel section 360 includes two bearing members 361 which are mounted in mirror-like relationship about the periphery of capsule 54. Bearing members 361 are interconnected by means of fasteners 362 so that the bearing surfaces of these members may be set at a predetermined position to engage the periphery of the capsule 54 as it expands. Bearing members 361 immobilize the outer periphery of capsule 54 so that only the inner portion may be moved, and thus absorb a portion of the hydraulic pressure and reduce the effective hydraulic surface area of the capsule. Fasteners 362 may be adjusted to change the constraint spacing. With close spacing, the capsule 54 is more constrained and delivers less effective hydraulic force during the working part of its stroke.

Some degree of adjustment of the time of application and the proportion of braking force between the front and rear wheel brake units may be attained by rotation of adjusting collars 272. As the expansion capsules expand, an increasing portion of the pressure performs mechanical work, during the latter part of the stroke, that is necessary to strain the capsule walls. This dissipation of a portion of the hydraulic pressure results in a reduction of the effective hydraulic surface area. Accordingly, if desired, the rear brake shoes may be positioned at a greater distance from the rim to bring the rear wheel brakes into contact with the rear rim only in the latter part of the capsule stroke, with the result that the front wheel braking force will be applied earlier and will be greater in magnitude than the rear wheel braking force.

It is also possible, if desired, to arrange for the application of an initial light braking force to the rear wheel alone for low speed braking, i.e., below 5 m.p.h., with a stronger force then being applied to the front wheel for braking at higher speeds. The front brake shoe will wear more than the rear brake shoe during heavy braking, so that the utilization of the rear brake shoes for light braking will tend to balance the overall wear on the brake shoes. This may be achieved by utilizing wave washer springs having smaller spring constants at the rear wheel so that the rear brake unit will respond most quickly in low speed braking, and providing a smaller effective hydraulic surface area at the rear expansion capsule than at the front expansion capsule. Then, with increased lever stroke, the pressure on the front pressure plates will overcome the stronger wave washer springs in the front brake unit, to apply a greater braking force to the front wheel. Since the forces created by the springs is a function of displacement only, the spring forces in each of the brake units become less significant as the hydraulic pressure increases.

The ability to apply a greater braking force to the front wheel is believed to be a function of the position of the center of gravity of the rider —i.e., the weight distribution on the front and rear wheels —and the dynamic effect of the forward movement of the center of gravity during braking which increases the reaction force between the front tire and the ground. In any event, contrary to the teaching of the prior art, it has been found possible to apply more than one-half the total braking force to the front wheel, with the ratio of braking force between the front and rear wheels always limited by the requirement that the braking force applied at the rear wheel must be sufficiently large to cause it to lock up and skid before the front wheel does so.

BRAKE SHOE AND MOUNTING ASSEMBLY

Although conventional brake shoes can be employed with the caliper brake unit of the present invention, conventional brake shoes do tend to wear the leading end of the brake shoe unduly. Accordingly, an improved brake shoe assembly is disclosed which tends to reduce wear by proportioning the braking across the working surface of each brake shoe. Moreover, the brake shoe of this invention is replaceable to provide for a more economical assembly.

In FIGS. 10, 11, and 12, the brake shoe assembly consists of three principal elements: a brake shoe 501 made of an elastomeric compound, a formed sheet metal holder 502, and a mounting stud 503.

Brake shoe 501 may be made of extruded stock of a generally trapezoidal cross section which is wider at the base for retention in holder 502, and narrows outwardly to approximately the bicycle wheel rim width at the working surface 501a. Working surface 501a is not parallel to the base surface, but is set at an angle corresponding to the rim angle so that the brake shoe working surface is complementary to the rim surface.

Holder 502 may be formed in a shallow arc corresponding to the curvature of the wheel rim (FIG. 7), to provide for maximum surface area engagement with the wheel rim. Holder 502 comprises a generally rectangular base 504 having inwardly slanted, longitudinal, side retaining walls 505 and perpendicular end retaining walls 506 depending therefrom, to define a retaining zone having a trapezoidal transverse cross section smaller in dimension than brake shoe 501 and a length corresponding in length to the brake shoe. The height of the brake shoe 501 is greater than the height of the retaining walls, so that working surface 501a is beyond the free ends of the retaining walls.

End retaining wall 506 which is adapted to be positioned in a downstream sense with respect to wheel rim rotation extends substantially the full height of the side retaining wall 505 to restrain and prevent slipping movement of brake shoe 501 as it is urged in the direction of rim rotation during the braking operation. At the opposite end of holding element 502, retaining walls 505 are mitered to provide an access portion 507 so that it is possible to change the brake shoe 501 without discarding the holding element, as is commonly the practice with conventional brake shoe assemblies. To remove brake shoe 501, it is grasped, as by pliers, at the end exposed by access portion 507, lifted over the low end retaining wall 506 and pulled out of the holder element. A new brake shoe is inserted by a reversal of this procedure. The mitered portion 507 permits the lifting of the brake shoe over the low end retaining wall by flexing the shoe without need for excessive force.

The brake holding element 502 is secured in mounting slot 214, 314, and 414 by means of mounting stud 503. To accommodate stud 503, the base portion of holder 502 is embossed outwardly at 508 to define clearance hole 509 through which stud 503 passes. The dimensions of embossment 508 are such as to permit holder 502 to bridge the mounting slot in any plausible angular position necessary for aligning the brake shoe with the bicycle wheel rim.

Stud 503 has a head 503a to fit against the sides of embossment 508 to prevent rotation when a fastener nut 510 and washer 511 are threaded on the end of the stud to attach it to the mounting slot.

To reduce uneven wear of the brake shoes, it has been found that mounting stud 503 should be displaced towards the trailing end of brake shoe holder 502. In conventional brake shoes in which the stud extends from the center of the holding element, the brake shoe tends to be cocked when applied to the rim, thus providing greater wearing at the leading end of the working surface 501a.

The amount of displacement of the stud 503 towards the trailing end may range from a ratio of 52:48 to 65:35 and preferably about 55:45. These ratios represent the relative length of brake shoe ahead of and behind the stud location, respectively.

RIM WIPERS

Since bicycles are ridden in all types of weather and on a variety of roads or bicycle paths, it is desirable to provide for the accommodation of proper braking under various weather and road conditions.

One of the deficiencies of conventional caliper type bicycle brakes is that they lose a great deal of their effectiveness in wet weather. When bicycles are ridden in the rain or on wet pavement, water is deposited on the wheel rims. This water acts as a lubricant so that in bicycles equipped with caliper brakes, the brake shoes slide more easily on the rims, with the result that stopping distances will increase substantially as compared to stopping distances under dry conditions. It is not unusual for a conventional brake system which will stop a bicycle ridden at a given speed within, say, 20 feet to require as much as twice that distance to bring the bicycle to a stop from the same speed when the rims are wet. In the past, various lugs, or the like, on the working surface of the brake shoes have been tried to increase the effectiveness of the brake shoes on wet rims, but these modifications have for various reasons been unsuccessful.

FIGS. 10 and 11 illustrate a wiper means 540 which is adapted to remove water from the bicycle rim prior to the engagement thereof by the brake shoe. Wiper means 540 includes a squeegee element 542 which defines a plurality of spaced-apart protrusions or squeegee wipers 542a, the width of which has been enlarged for clarity.

Wiper element 542 may be made of any durable, resilient elastomeric material such as rubber, either natural or synthetic. The material should be soft enough to yield easily, but strong enough to carry water away from the rim. A preferred material is neoprene having a durometer hardness reading in the range of about 50 to about 70, preferably a reading of about 60. The squeegee wipers 542a are skewed so that as the wheel rim moves past wiper means 540 they throw the water radially outwardly of the wheel. Wiper element 542 is preferably made of an extrusion which is then cut off on the bias so as to provide the desired skew. The outer edge of each squeegee wiper is skewed or tilted, in the downstream sense of wheel rotation, at an angle to the plane containing a radius and the axis of rotation of the bicycle wheel. The skew angle may range from about 5° to about 75°, with a skew angle of about 30° being preferable.

Wiper element 542, as illustrated, is mounted on brake element stud 503 by means of an elongated, contoured support spring 546 which is adapted to position the wiper element upstream of the brake shoe in the sense of wheel rotation. The end of spring support 546 at which wiper 542 is positioned is provided with a skewed projection 546a adapted to be in engagement with the upstream end of element 542. Element 542 is retained on spring support 546 by means of a folded, integral tab 546b which engages the trailing end of the element and side wall retainer projections 546c. Tab 546b also prevents the wiper 542 from moving towards the brake shoe during engagement with the rim.

Support spring 546 may be made of any resilient material, preferably beryllium bronze. Support spring 546 is contoured, as best illustrated in FIG. 11, so that the downstream end or fastening end may be placed over stud 503, which holds brake shoe holder 502 in slot 314. In the embodiment shown, the fastener end of spring support 546 is positioned outboard of nut 510, and a second nut 550 and washer 551 are utilized to secure the spring support to stud 503. The use of two nuts 510 and 550 permits independent alignment of the brake shoe and wiper. Nut 510 may be omitted, if desired, and nut 550 used alone, which is a more economical construction but makes necessary the simultaneous alignment of both the brake shoe and the wiper.

Element 542 is adapted to engage the wheel rim prior to the engagement thereof by the working surface 501a of the brake shoe. To this end, a relatively inflexible adjusting member 560 is interposed between washer 551 and support spring 546. Adjusting member 560 defines a threaded hole 562 at its free end which is positioned in register with spring support 546. A thumb screw 564 passes through hole 562 and engages spring support 546 to position the wiper working surfaces of squeegee wipers 542a in advance of the working surface 501a of the brake shoe and slightly closer to the curved bicycle wheel rim, as illustrated by distance $d$ in FIG. 11.

Preferably brake shoe 501 is adjusted to run in close proximity to the rim without touching it. In such a situation, thumb screw 564 may be adjusted so that squeegee wipers 542a are brought into light engagement with the rim. Or, if the rider prefers, wiper 542 may be adjusted so as to be out of contact with the rim until the brake shoe is actuated.

If wet weather is frequently encountered, it is preferable that the squeegee wipers 542a make a light continuing contact with the rim so that water is being wiped away at all times. Even if squeegee wipers 542a do not make contact with the rim under normal riding conditions, it is desirable that when the brake shoe is actuated, the wiper should be adjusted so that it will make contact before the brake shoes. This permits a rider to actuate the actuator assembly lightly from time to time when riding in wet weather, so as to wipe the water from the rims before engaging the brake shoes. When the brakes are then actuated, the braking effect is much enhanced.

DRIVE SYSTEM BRAKE ACTUATOR ASSEMBLY

The actuator assembly, as described above, may be actuated by a lever positioned at the handlebar. Alternatively, the actuator assembly may be modified to be operated by reverse movement of the chain drive of the bicycle. FIGS. 15 and 16 show modifications which may be utilized to provide a brake system capable of actuation by reverse movement of the pedals. Actuator assembly 600 is different in only minor respects from actuator assembly 50 previously described, and corresponding elements thereof are numbered with corresponding numerical designations. In place of plate 62, bracket 601 is utilized to mount actuator assembly 600. Bracket 601 is adapted to position the actuator assembly between main support member 24 and upwardly inclined support member 34.

Bracket 601 is generally L-shaped (FIG. 15) and defines a forwardly facing, generally H-shaped main portion 602 (FIG. 16). Legs 603 at the forward end of the bracket are arranged to receive support member 34 therebetween. An upwardly facing lug 604 is provided at the base between legs 603 and is bent at a right angle to main portion 602. Lug 604 bears against support member 34 to maintain main portion 602 in perpendicular relationship with the support member. Hose clamp 606 encompasses support 34 and overlies lug 604 to fasten bracket 601 on the support member.

The rearward end of bracket 601 is supported on main support member 24 by means of a bifurcated portion 608 which receives the main support member therein. An upwardly facing lug 609 is provided at the base of the bifurcated portion 608 to bear against main support member 24, and a hose clamp 610 secures bracket 601 to the main support member.

Bracket 601 is adapted and arranged to have the principal actuating load, to be described below, carried by the support member 34. Bifurcated portion 608 and clamp 610 assist in load carrying, but also resist the lateral torque which is created when actuator assembly 600 is operated.

To provide a mounting means and support for the actuator assembly 600, bracket 601 has two folded up portions 612, one on each side of the bracket. Each folded up portion defines two spaced apart lugs 614 which are apertured to accept pins 70 therein. Lugs 614 support the actuator assembly in similar fashion to the eyelet portions 64 of plate 62, described previously.

Cover 110 is modified slightly from that shown in FIGS. 2, 3, and 4 to provide an exit for tubes 52 at a location 90° from the position used at the handlebar. Tubes 52 are conveniently taped to main support 24 or support 24 and support 34 for bicycles designed for use by boys or girls, respectively.

Actuator assembly 600 is operated by means of a ratchet and pawl system. A ratchet disc 620 is mounted to the inner sprocket 46a by any suitable means as, for example, utilizing the bolts 621 by which the drive sprockets 46a and 46b are fastened together. A spacer 622 is interposed between the ratchet disc 620 and the drive sprocket 46a. In this manner ratchet disc 620 will rotate conjointly with sprockets 46a and 46b.

Ratchet disc 620 is adapted to engage a pawl element 625 which is mounted on a square rotary shaft 626. Shaft 626 carries three tubular spacers 628a, 628b, and 628c. Spacers 628a and 628c are journaled for rotary movement in tabs 605 which extend downwardly from the outer edges of legs 603 to define a pair of spaced apart, mounting tabs to support shaft 626. Shaft 626 is biased in a clockwise direction (as seen in FIG. 15) by means of torsion spring 627 interposed between the shaft and spacer 628b to maintain pawl 625 in position for engagement by ratchet disc 620.

In place of lever 80, two links 630 are mounted on shaft 626. Each link extends rearwardly and upwardly toward actuator assembly 600, and defines a curved cam portion 632 at its free end which is received in one of the cut-outs 102 of protrusion 98, described above. Links 630 together with the pawl 625 provide a lever system for transforming the reverse or counterclockwise rotation of the pedals into a force for actuating the brake system.

The lever system formed by the pawl 625 and links 630 is designed to reduce the force applied by the rider at the foot pedals so that the force exerted in compressing capsules 52 is not excessive. This is accomplished by providing links 630 which are longer than the radial distance of the ratchet disc teeth from the center of rotation of the ratchet disc. In a typical embodiment, the mechanical ratio between the drive sprockets and ratchet disc 620 is of the order of about 2½ to 1 so that when a rider puts his full weight against the pedal in the reverse direction, the force generated by levers 630 will not be so great as to cause a sudden and complete actuation of the brakes, i.e., lockup of both front and rear wheels, and control of the bicycle may be maintained. In addition to reducing the force applied by the levers 630 (as compared to the force applied by the rider to the brake pedals), the upper surface 630a of each lever is flat and designed to contact the lower surface of bracket 601 to provide a limit to the stroke of the levers. This limit assures that an excess loading on the levers is absorbed by the bracket rather than possibly damaging the actuator assembly itself.

As illustrated, the teeth 620a of ratchet disc 620 have been enlarged for clarity of illustration. In practice the teeth pitch would be reduced to ½ or ⅓ of the pitch illustrated in FIG. 15.

A still further alternate means for operating the actuator assembly by the chain system would be to utilize the idler assembly 650 (FIG. 1) to operate the actuator assembly. Idler assembly 650 is designed to take up slack in the lower reach of the drive chain on racer or touring bicycles which have more than three speeds. When the chain is driven in the reverse direction, the idler arm rotates counterclockwise. By mounting an actuator assembly to stay 28 and modifying links 630 to extend beyond shaft 626, the extended portions of the links could be pivotally attached to the idler arm. Thus when the pedals are rotated in the reverse direction tending to pull the idler arm forward, links 630 would be rotated and the actuator assembly operated. While this alternative is feasible, it is not preferred due to the various idler assemblies employed by different bicycle manufacturers. This large variety would necessitate a number of different designs, which would mitigate against economical production.

ALTERNATIVE MOUNTING MEMBER

In addition to the modifications and alternatives already enumerated, there is shown in FIG. 17 an alternative embodiment for mounting member 201. Mounting member 700 includes a two-piece construction having a body 701 and a reinforcing member 702. Mounting member 700 is conveniently formed by a stamping process.

Body 701 includes a generally rectangular shaped main portion 703 from which extends a coplanar, generally U-shaped portion 705. Main portion 703 includes a downwardly directed, transverse, reinforcing ridge 704 and multiple cutouts 704b to lighten the weight thereof. Portion 703 is folded up about its periphery to form reinforcing walls 706 at each side thereof and two sets of spaced apart, apertured mounting lugs 708 and 709. The apertures in each set of lugs are in register and are adapted to receive one of the pins 204 therein. Portion 705 is smaller in width than the width of portion 703, and the free end thereof is also folded up to provide a tab 712 which is apertured to receive bolt 202 therein for attaching the mounting member to the bicycle, as described above.

Reinforcing member 702 is generally U-shaped and provided with legs 720 which are tapered on their upper surfaces. The free end of each leg is provided with a lug 721 which is inserted in a slot 723 in the folded up end wall of the body. The end of each leg adjacent lug 721 is cut back to provide a clearance between the end of the leg and the folded up end. Base 726 of member 702 is apertured to provide a hole in register with the hole in tab 712. The reinforcing member is sized so that base 726 abuts tab 712. Base 726 is stamped with two outward dimples 728 which are inserted in two holes or recesses in tab 712 to maintain the two members in assembled form as shown.

When a braking foce is applied to the wheel rim, the reaction load on the mounting member 700 causes the outer extremity (opposite tab 712) of the mounting member to deflect upwardly. The clearance between the ends of the legs 720 and the folded-up end wall permits sliding engagement between the top surface of body 703 and the bottom surfaces of the legs as the slots 723 move inwardly relative to lugs 721. This engagement brings about frictional losses which tend to dampen out vibration and/or squeaking in the mounting member.

ALTERNATIVE HANDLEBAR ACTUATOR ASSEMBLY

Figure 18:
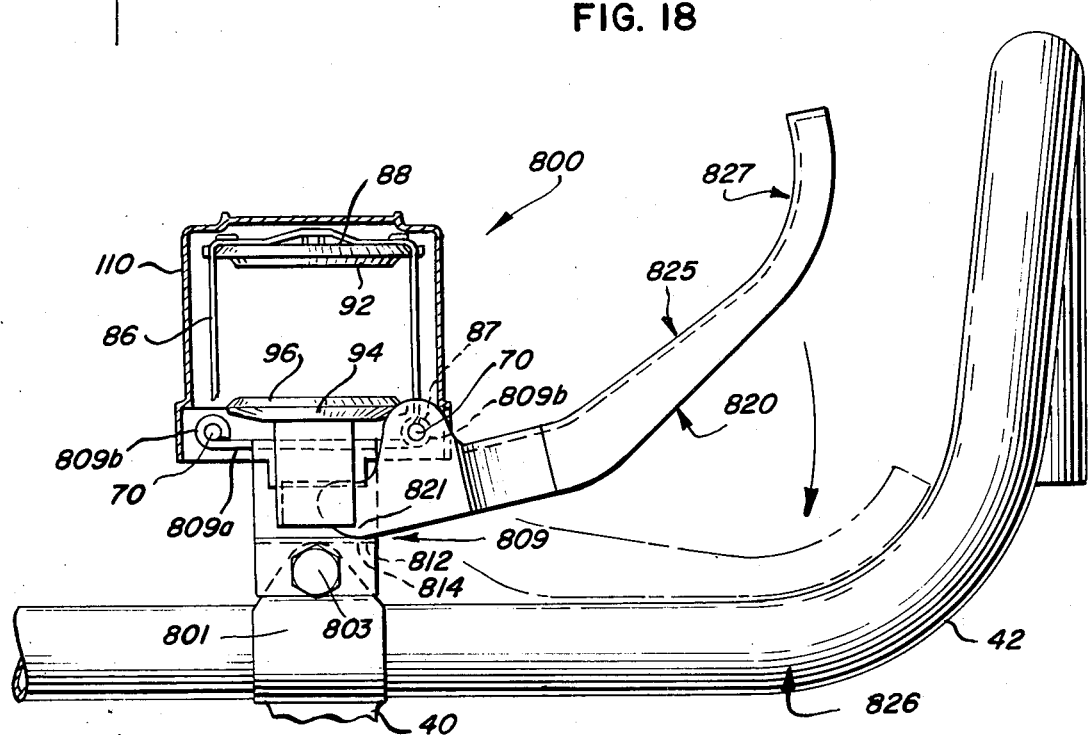
FIG. 18 is a fragmentary top plan view with certain portions in cross section and certain elements removed for clarity of illustration, showing an alternate actuator assembly at the handlebar of a bicycle.
Figure 19:
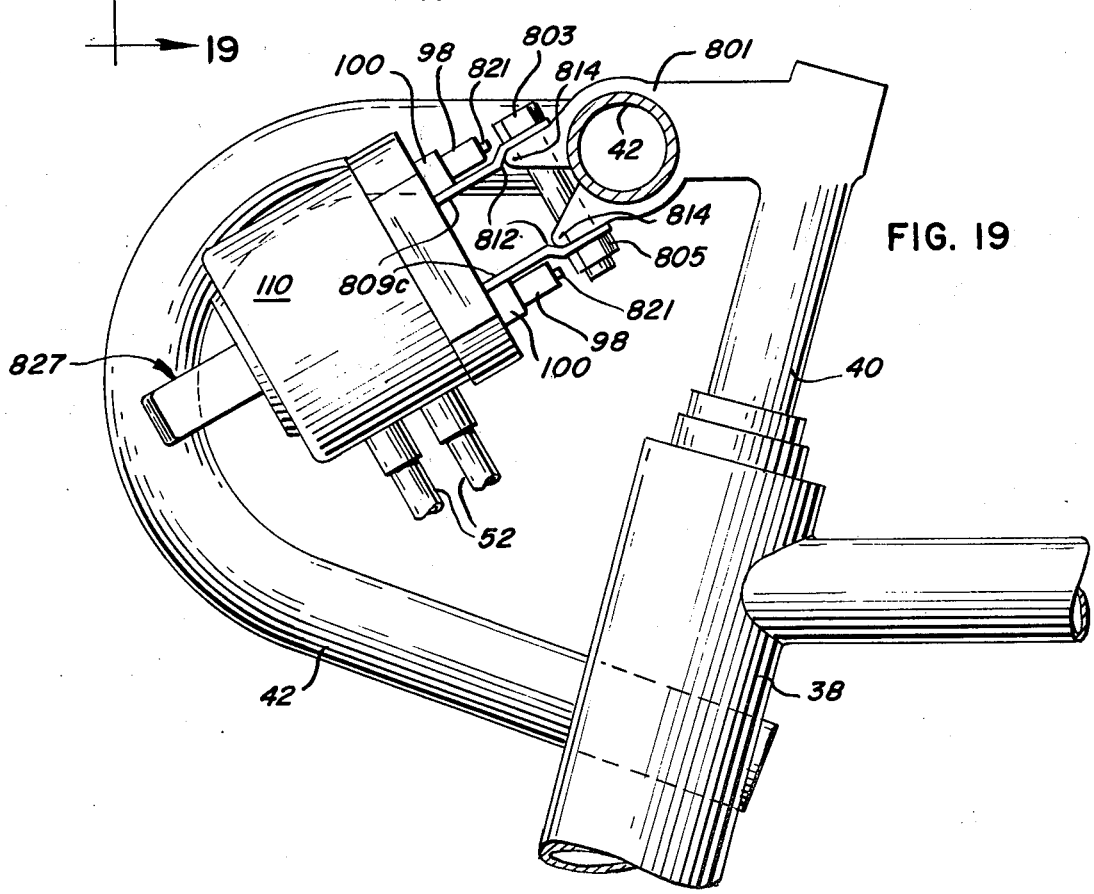
FIG. 19 is a sectional view taken generally along the line 19—19 in FIG. 18.

A still further modification of the present invention is shown in FIGS. 18 and 19 wherein the actuator assembly 800 is mounted at the junction of the handlebar 42 and top of the stem of front wheel fork 40. In the illustrated embodiment, handlebar 42 is of the racing or touring type, as previously described, and is joined at its center to fork 40 by means of a collar clamp 801 which extends forwardly from the top of the stem. Handlebar 42 is centered laterally within collar clamp 801 and fixedly retained therein by means of bolt 803 and nut 805, which, when tightened, cause collar clamp 801 to exert a radial force against the handlebar 42.

Actuator assembly 800 is different in only minor respects from actuator assembly 50 previously described and corresponding elements thereof are numbered with corresponding numerical designations. Specifically, only previously described plate 62, clamp 66 and lever 80 require modification.

In place of plate 62, bracket 809 is utilized to mount actuator assembly 800. Bracket 809 includes a generally rectangularly-shaped flat midportion 809a which is provided with turned eyelet portions 809b at its lateral ends (FIG. 18), similar to portions 64 described above.

Extending rearwardly from the top and bottom edges of portion 809a is a pair of spaced apart tabs 809c. Tabs 809c are contoured and apertured to be attached to collar clamp 801 by bolt 803, the upper tab being positioned between the head of bolt 803 and the upper surface of clamp 801 and the lower tab being positioned between the lower surface of clamp 801 and nut 805, as shown in FIG. 19. Each tab 809c is contoured at its midportion to provide a bearing shoulder 812 to fit snugly against the leading edge 814 of its associated collar clamp to provide torsional resistance to prevent relative rotation between actuator assembly 800 and handlebar 42.

The movable pressure plate 94 is moved axially within actuator assembly 800 by means of a lever 820. Lever 820 is U-shaped in cross-section facing towards handlebar 42. Lever 820 is pivotally mounted to actuator assembly 800 by means of vertical pin 70 to provide a fulcrum. Lever 820 is thus positioned for manual operation adjacent and in front of handlebar 42. The inner end of lever 820 (between pins 70) is bifurcated to straddle tabs 809c and defines cam portions 821, similar to cam portions 82, which function to move pressure plate 94 when lever 820 is rotated.

As best illustrated in FIG. 18, lever 820 is generally U-shaped and opens towards the front of the bicycle. This U-shape provides an intermediate portion 825 adapted to be grasped by the fingers of the hand while the thumb grasps the handlebar at the portion radiating from clamp 801 at a position generally indicated at 826 to provide a reaction member for operating lever 820. The throw or stroke generated by lever 820, as with lever 80, is sufficient to compress either compressor capsule should one of the capsules become inoperative due to leakage.

The base of U-shaped portion 827 of lever 820 immediately adjacent the free end thereof is generally parallel to the downturned portion of handlebar 42 so that, if desired, when the fingers grasp this portion of the handlebar, the thumb may grasp portions 827 and rotate lever 820.

It will be appreciated from the above description that various modifications may be made to the brake system of the present invention by those skilled in the art without departing from the scope and spirit of the invention.

What is claimed is:

1. A hydraulic bicycle brake system which comprises: means defining an actuating zone, said means being adapted to be attached to a bicycle; a first pressure plate located at one end of said actuating zone and axially movable within said zone; a second pressure plate fixedly attached to said first mentioned means at the opposite end of said zone; means adapted to move said first pressure plate axially in said actuating zone toward said second pressure plate; two independent hydraulic circuits, each circuit including only two expansible capsules, one being a compressor capsule and one an expansion capsule, said two capsules in each circuit being interconnected by tubing to provide communication therebetween, each of said circuits being sealed and charged with hydraulic fluid, the compression capsule of each circuit being positioned between said first and second pressure plates in juxtaposed relationship, each of said capsules having two generally parallel main walls, the external surfaces of said two main walls together constituting the major portion of the external surface of the capsule, the compressor capsule of each of said two hydraulic circuits being arranged with one of its said main wall external surfaces in close adjacent relationship with one of the main wall external surfaces of the other of said compressor capsules, thereby the compressor capsules between said plates are simultaneously compressed in an axial direction when said first pressure plate is moved axially toward said second pressure plate; a pair of elongated, spaced apart brake links adapted to be mounted adjacent each wheel of a bicycle, each of said links carrying a brake shoe at one end adapted to be positioned adjacent the rim of a bicycle wheel and being pivotally attached at its midportion to pivot means disposed transversely between said links; housing means located between the ends of each pair of said brake links opposite said one end thereof, the expansion capsule in each of said hydraulic circuits being positioned in said housing means; third and fourth pressure plates on opposite sides of said capsule within said housing means and adjacent said respective opposite ends of said links; means interposed between said housing and each of said latter pressure plates for resiliently biasing said pressure plates inwardly of said housing into engagement with the external surfaces of said two main walls of their associated expansion capsule; and means for pivotally attaching each of said latter pressure plates to its respective link, whereby compression of said capsules in said actuating zone causes simultaneous expansion of the capsules in said two housing means to pivot the brake shoes on said links into braking engagement with the rim of a bicycle wheel while each of said two housing means and members associated therewith freely follow the lateral movement of their respective bicycle wheel rim.

2. The brake system of claim 1 wherein said means for moving said first pressure plate includes a lever pivotally attached to said actuating zone defining means, said actuating zone defining means being adapted and arranged to present said lever adjacent the handlebar of the bicycle, whereby said lever may be manually operated.

3. The brake system of claim 2 wherein said actuating zone defining means is attached directly to the handlebar.

4. The brake system of claim 2 wherein the operative stroke of said lever is sufficient to move said pressure plate and compress either of said compressor capsules, whereby a braking force is provided by one of said hydraulic circuits in the event that the other circuit is inoperative.

5. The brake system of claim 2 wherein said actuating means is adapted to be mounted at the junction of said handlebar and the top of the stem of the front wheel fork, and said lever is positioned adjacent the handlebar portion extending from said junction.

6. The brake system of claim 5 wherein said system is adapted to be used on a handle bar of the turned down racing type and said lever is generally U-shaped and opening toward the front of the bicycle to provide an intermediate graspable portion adjacent the handlebar radiating from said junction and a free end graspable portion of adjacent the turned down portion of the handlebar.

7. The brake system of claim 1 wherein each of said compressor and expansion capsules has a generally elliptical cross section and the unexpanded state and has at least one depression in at least one of the surfaces thereof that are generally parallel to the major axis of said ellipse.

8. The brake system of claim 7 wherein each of said surfaces has a plurality of depressions to facilitate expansion and compression of said capsules.

9. The brake system of claim 7 wherein said depression is located with its geometrical center substantially at the geometrical center of said surface.

10. The brake system of claim 9 which includes a plurality of said depressions positioned concentrically on said surface.

11. The brake system of claim 9 wherein said depression is circular.

12. The brake system of claim 9 wherein said depression is annular.

13. The brake system of claim 12 which includes a plurality of annular depressions positioned concentrically on said surface.

14. The brake system of claim 1 wherein said hydraulic fluid is a mixture of water and ethylene glycol to prevent said fluid from freezing.

15. The brake system of claim 1 wherein said system is adapted and arranged to deliver a greater braking force through the brake shoes at the front wheel than through the brake shoes at the rear wheel.

16. The brake system of claim 1 wherein said opposite end of each of said brake links defines a plurality of connecting locations for said attaching means at various distances from said midportion of the link, whereby the length of the moment arm acted upon by said attaching means may be adjusted.

* * * * *

UNITED STATES PATENT AND TRADEMARK OFFICE
CERTIFICATE OF CORRECTION

PATENT NO. : 3,993,174
DATED : Nov. 23, 1976
INVENTOR(S) : Lynn A. Williams et al.

It is certified that error appears in the above-identified patent and that said Letters Patent are hereby corrected as shown below:

```
Column 1, line 34, change "be:d" to --be--;
Column 1, line 38, after "young" insert --rider--
Column 5, line 20, "lock up" to read --"lock up"--;
Column 5, line 62, change "The present system of the present
                   invention" to read --The brake system of the
                   present invention--.
Column 6, line 26, change "e" to read --be--;
Column 6, line 31, change "end" to read --ends--.
Column 10,line 59, change "121" to read --212--.
Column 12, line 14, before "bicycle" insert --the--;
Column 12, line 15, change "the" to --The--;
Column 12, line 18, change "flow" to read --follow--;
Column 12, line 40, change "hols" to --holes--.
Column 14, line 15, change "foce" to read --force--.
Column 15, line 41, "i.e" to be in italics;
Column 15, line 52, "lock up" to read --"lock up"--.
Column 21, line 3, change "foce" to read --force--.
Column 22, line 11, change "portions" to --portion--;
Column 22, line 45, change "thereby" to --whereby--.
Column 23, line 35, delete "of" after word portion
                    (first occurrence).
```

Signed and Sealed this ninth Day of August 1977

[SEAL]

Attest:

RUTH C. MASON
*Attesting Officer*

C. MARSHALL DANN
*Commissioner of Patents and Trademarks*